US006981731B2

(12) United States Patent
Welch et al.

(10) Patent No.: US 6,981,731 B2
(45) Date of Patent: Jan. 3, 2006

(54) RETRACTABLE SEAT ASSEMBLY FOR A MOTOR VEHICLE

(75) Inventors: Christopher Welch, Farmington Hills, MI (US); Ben Sung Chang, Northville, MI (US); Colin G. Neale, Northville, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/250,892

(22) PCT Filed: Jan. 14, 2001

(86) PCT No.: PCT/US02/01086

§ 371 (c)(1),
(2), (4) Date: Jan. 22, 2004

(87) PCT Pub. No.: WO02/055332

PCT Pub. Date: Jul. 18, 2002

(65) Prior Publication Data

US 2004/0222657 A1    Nov. 11, 2004

Related U.S. Application Data (60) Provisional application No. 60/322,128, filed on Sep. 13, 2001, provisional application No. 60/261,398, filed on Jan. 12, 2001.

(51) Int. Cl.
 *B60N 2/02* (2006.01)
(52) U.S. Cl. .................... 296/68; 296/64; 296/65.01
(58) Field of Classification Search .............. 296/68, 296/65.09, 65.03, 65.13, 64, 65.05, 68.1, 296/63, 69, 65.01, 65.14; 297/378.12, 238, 297/344.1, 341, 335, 378.1, 452.18, 378.11, 297/336, 378.13, 331, 14
See application file for complete search history.

(56) References Cited

U.S. PATENT DOCUMENTS

| 3,132,781 | A | * | 5/1964 | Poczatek ................. 224/42.33 |
| 3,202,453 | A | * | 8/1965 | Richards ..................... 296/66 |
| 4,580,832 | A | * | 4/1986 | Maruyama et al. ........... 297/14 |
| 5,669,537 | A | | 9/1997 | Saleem et al. |
| 5,879,053 | A | * | 3/1999 | Lux et al. ................. 297/378.1 |
| 5,890,758 | A | | 4/1999 | Pone et al. |
| 5,975,612 | A | | 11/1999 | Macey et al. |
| 6,116,676 | A | * | 9/2000 | Edwards ...................... 296/64 |
| 6,176,535 | B1 | | 1/2001 | Chaloult et al. |
| 6,196,612 | B1 | | 3/2001 | Grimes |
| 6,224,132 | B1 | * | 5/2001 | Neale ........................ 296/68.1 |
| 6,234,553 | B1 | | 5/2001 | Eschelbach et al. |
| 6,338,516 | B1 | * | 1/2002 | Toyota et al. ................. 296/64 |
| 6,398,291 | B1 | * | 6/2002 | Reusswig et al. ......... 296/65.05 |
| 6,481,772 | B1 | * | 11/2002 | Tenn ........................ 296/65.01 |

(Continued)

FOREIGN PATENT DOCUMENTS

DE    42 37 258 A1    11/1992

(Continued)

*Primary Examiner*—Kiran B. Patel
(74) *Attorney, Agent, or Firm*—Clark Hill PLC (57) ABSTRACT

A rear seat assembly (12) movable between a use configuration and a stowed configuration within a passenger compartment (10) of a motor vehicle. The rear seat assembly (12) includes a seat cushion (24) having a front portion and a rear portion, a seat back (26) disposed adjacent to the rear portion of the seat cushion, and a translator coupled to the seat back. The translator (58) moves the seat back between the use configuration and the stowed configuration in which the seat back is adjacent to a rear lift gate (22) of the motor vehicle.

6 Claims, 8 Drawing Sheets

U.S. PATENT DOCUMENTS

2004/0239137 A1 * 12/2004 Buccinna et al. ........ 296/65.09

FOREIGN PATENT DOCUMENTS

| DE | 44 06 651 C1 | | 3/1994 |
|---|---|---|---|
| DE | 199 43 454 C1 | | 9/1999 |
| FR | 2 725 669 A1 | | 10/1994 |
| JP | 11 78634 | * | 3/1999 |
| JP | 2000 142477 | * | 5/2000 |
| JP | 2004 314665 | * | 11/2004 |
| WO | WO 99/29534 | | 6/1999 |

* cited by examiner

RETRACTABLE SEAT ASSEMBLY FOR A MOTOR VEHICLE

RELATED APPLICATION

This application is a 371 filing of PCT Application US02/01086, filed Jan. 14, 2002, which claims priority to and all the benefits of U.S. Provisional Patent Application Nos. 60/261,398, filed on Jan. 12, 2001 and 60/322,128, filed on Sep. 13, 2001.

BACKGROUND OF THE INVENTION

1. Field of the Invention

The invention relates to vehicle seat assemblies. More particularly, this invention is directed to a rear seat assembly that is movable to a position adjacent to a rear lift gate to provide unobstructed access to a passenger compartment through the rear lift gate.

2. Description of the Related Art

Certain motor vehicles, such as minivans and sport utility vehicles, include a second and even a third row of seat assemblies for vehicle passengers. However, there are times when a vehicle operator will alternatively desire additional cargo space within the motor vehicle rather than the additional row or rows of seat assemblies. In these instances, storage or removal of these seat assemblies is required to provide the additional cargo space desired.

Many vehicle seat assembly storage or removal systems are known in the art. For example, a seat assembly may be pivotally mounted to the floor of the vehicle by risers so that the seat assembly moves between an upright seating position and a forwardly folded position where the seat back is pivoted against the seat cushion and then the seat assembly is pivoted about the riser to an upright position adjacent a front row of seats. However, the risers utilized in such systems are often fixedly mounted to the vehicle floor and positioned inboard of the vehicle sidewall such that floor space is compromised and storage space diminished.

It is known to provide risers that may be removably detached from the vehicle floor so that the vehicle seat assemblies can be completely removed from the floor and the cargo area of the vehicle. Such removable seating assemblies provide for a maximum amount of cargo space. However, once the cargo has been removed, the additional seating space provided by the additional row or rows of seating assemblies is recovered only by going back to the place where the vehicle seat assembly was removed and then reinstalling the additional row or rows of vehicle seat assemblies.

In addition, rollers have been used to aid in the removal of seat assemblies. Finally, storage systems providing for storage of the seat assemblies in a space underneath the vehicle floor are also known in the art. However, both rollers and storage systems underneath the vehicle floor require a large amount of user manipulation of heavy seat assemblies.

As a result, there is a need for a rear seat assembly that can be easily moved into a stowed configuration to provide access to a cargo storage area of the vehicle.

SUMMARY OF THE INVENTION

A rear seat assembly that is movable between a use configuration and a stowed configuration within a passenger compartment of a motor vehicle, which includes a floor, a roof, a pair of sidewalls extending between the floor and the roof, and a rear lift gate, has been provided. The rear seat assembly includes a seat cushion having a front portion and a rear portion. The rear seat assembly also includes a seat back disposed adjacent to the rear portion of the seat cushion, and a translator coupled to the seat back. The translator moves the seat back between the use configuration and the stowed configuration in which the seat back is adjacent to the rear lift gate.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
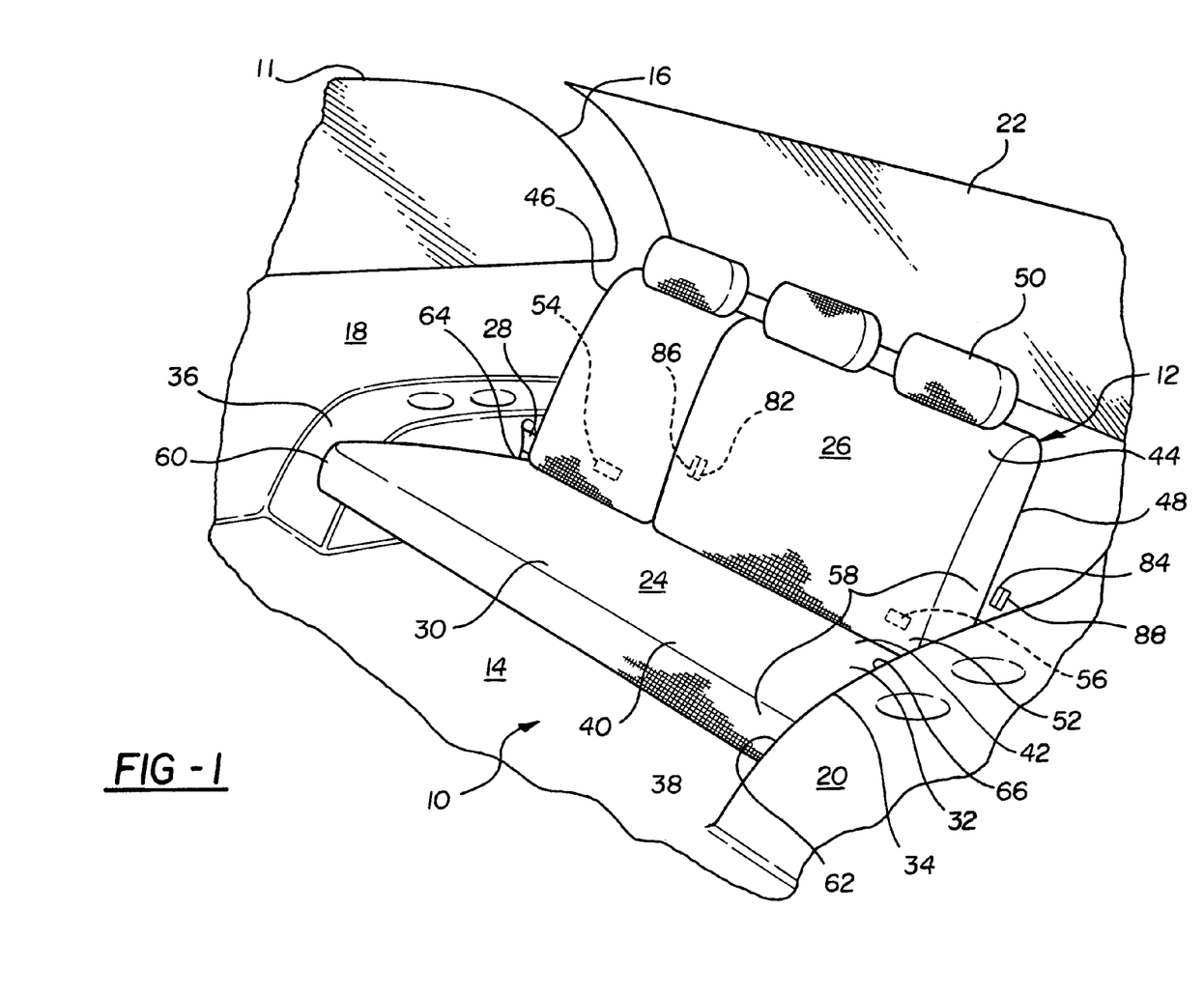
FIG. 1 is a perspective view of a rear seat assembly incorporating one embodiment of the invention including a seat cushion and a seat back in a use configuration and a passenger compartment of a motor vehicle, partially cut away.

Referring to FIG. 1, a passenger compartment of a motor vehicle 11 is generally shown at 10. The passenger compartment 10 includes a rear seat assembly, generally indicated at 12, as well as a floor 14 and a roof 16. A pair of opposing, generally parallel sidewalls 18, 20 interconnect the floor 14 and the roof 16. The floor 14 and the roof 16 are further interconnected by a rear lift gate 22. The rear lift gate 22 moves between a closed position and an open position in which the passenger compartment 10 is accessible for loading and unloading cargo.

The rear seat assembly 12 includes a seat cushion 24 and a seat back 26. The seat cushion 24 and the seat back 26 are pivotally interconnected by a recliner mechanism 28 for movement of the rear seat assembly 12 between a generally upright position and a folded position.

The seat cushion 24 includes a front portion 30 and a rear portion 32. The seat cushion 24 also includes a generally rectangular seat cushion frame 34 having a pair of generally parallel seat cushion side members 36, 38. A front cross member 40 and a rear cross member 42 connect the seat cushion side members 36, 38. The seat cushion frame 34 includes a pair of front roller mechanisms 60, 62 and a pair of rear roller mechanisms 64, 66 for supporting the seat assembly 12. The front roller mechanisms 60, 62 are generally positioned at the intersection of the front cross member 40 and the seat cushion side members 36, 38. The rear roller mechanisms 64, 66 are generally positioned at the intersection of the rear cross member 42 and the seat cushion side members 36, 38.

The seat back 26 includes a generally rectangular seat back frame 44 having a pair of generally parallel seat back side members 46, 48. The seat back side members 46, 48 are interconnected by an upper cross member 50 and a lower cross member 52. The seat back frame 44 includes a pair of seat back latch mechanisms 54, 56, which are fixedly secured to the lower cross member 52.

A translator, generally indicated at 58, is a group of mechanisms that cooperate to move the seat back 26. More specifically, the translator 58 provides a path through which the seat back 26 is retracted to its stowed configuration and moved forward to its use configuration. The translator 58 may engage upper and lower portions of the seat back 26 to effect the translation thereof between the two configurations. The translator 58 will be discussed in greater detail subsequently.

Figure 2:
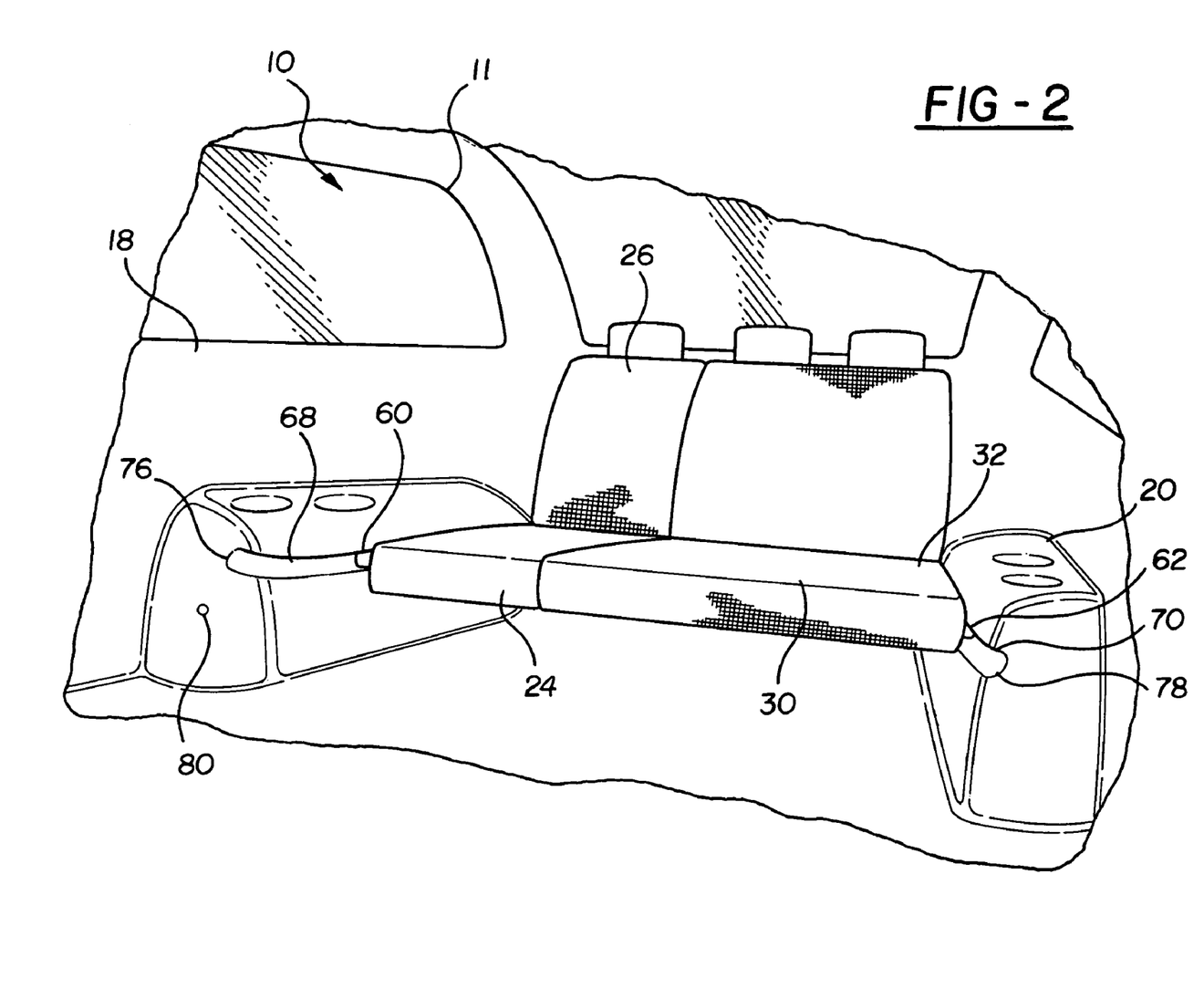
FIG. 2 is a perspective view of the rear seat assembly with the seat back adjacent to a rear lift gate.
Figure 3:
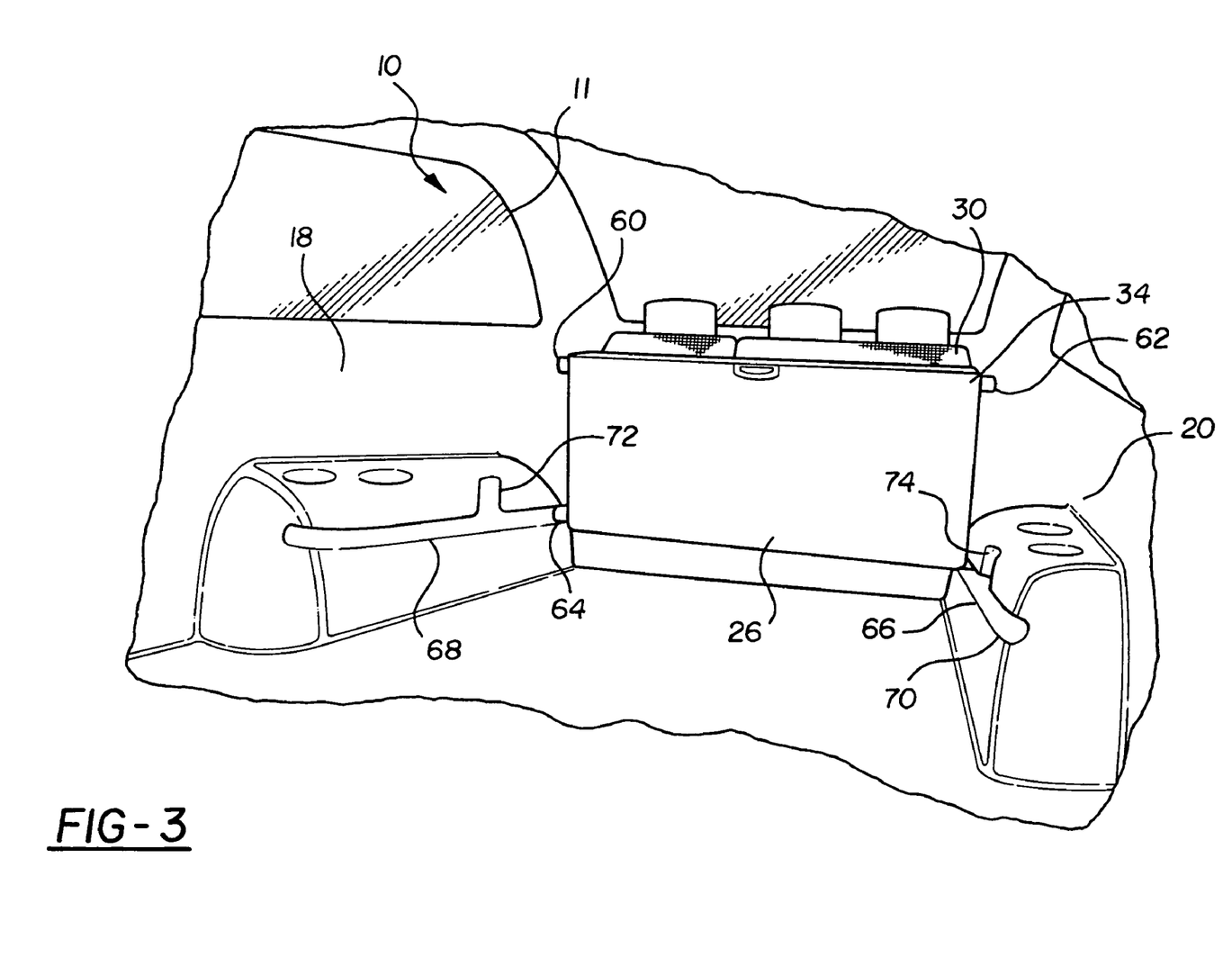
FIG. 3 is a perspective view of the rear seat assembly including the seat cushion and the seat back in a stowed configuration adjacent to the rear lift gate.

Referring to FIG. 3, the translator 58 includes generally parallel recesses 68, 70, which permit the front roller mechanisms 60, 62 and the rear roller mechanisms 64, 66 to engage the sidewalls 18, 20 and provide support for the seat assembly 12. The recesses 68, 70 allow the seat assembly 12 to move between a use configuration, as shown in FIGS. 1 and 2, and stowed configuration, as shown in FIG. 3. The recesses 68, 70 are shown having a C-shape, however, the recesses 68, 70 may be formed in various shapes. Each of the recesses 68, 70 include an upwardly extending relief 72, 74 for allowing the front roller mechanisms 60, 62 to disengage from the recesses 68, 70. Furthermore, when the rear seat assembly 12 is in the stowed configuration, the recesses 68, 70 are open next to the rear lift gate 22 to allow the rear roller mechanisms 64, 66 to disengage.

Referring now to FIG. 2, the translator 58 includes latch mechanisms 76, 78, which engage the front roller mechanisms 60, 62 when the rear seat assembly 12 is in the use configuration. The latch mechanisms 76, 78 thus hold the rear seat assembly 12 in the use configuration. A button 80 releases the front roller mechanisms 60, 62 from the latch mechanisms 76, 78, thus disengaging the seat cushion 24 and allowing for movement of the seat assembly 12 from the use configuration to the stowed configuration.

Referring once again to FIG. 1, the rear lift gate 22 further includes recess areas 82, 84. Each of the recess areas 82, 84 include a striker 86, 88. The recess areas 82, 84 receive the seat back latch mechanisms 54, 56 and guide the seat back latch mechanisms 54, 56 into engagement with the strikers 86, 88. The seat back latches 54, 56 lock the seat back 26 to the lift gate 22.

In operation, the rear seat assembly 12 is generally found in the use configuration. The recliner mechanism 28 is actuated bringing the seat back 26 to the generally upright position to allow the seat back 26 to mate with the rear lift gate 22. The button 80 is pressed, thereby releasing the front roller mechanisms 60, 62 and allowing the rear seat assembly 12 to pivot to the stowed configuration. As the stowed configuration is obtained; the latch mechanisms 54, 56 enter the recess areas 82, 84 which engage each of the latch mechanisms 54, 56 to the corresponding strikers 86, 88 located therein, thereby securing the rear seat assembly 12 to the rear lift gate 22. Finally, the recliner mechanism 28 is actuated to allow the seat cushion 24 to be lifted to a generally vertical position.

Figure 4:
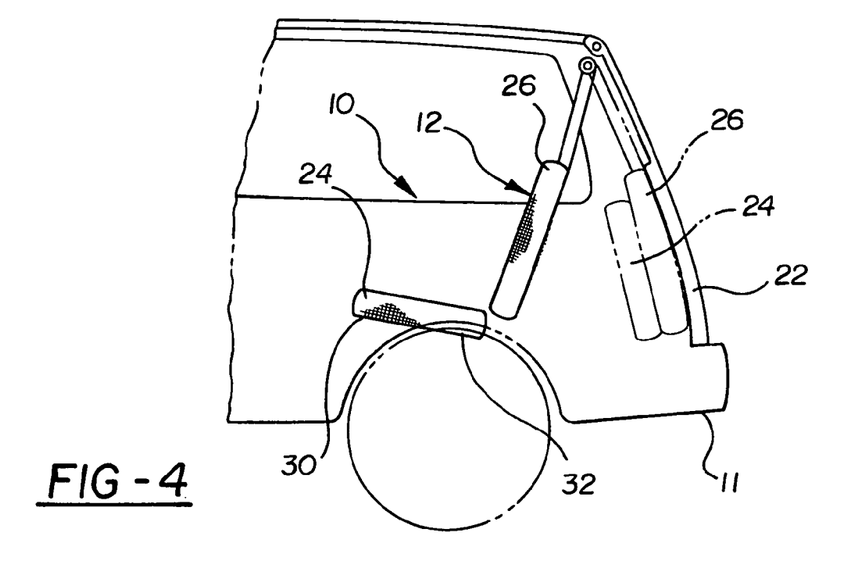
FIG. 4 is a cross-sectional, side view of the rear seat assembly in both the use configuration and the stowed configuration.
Figure 5:
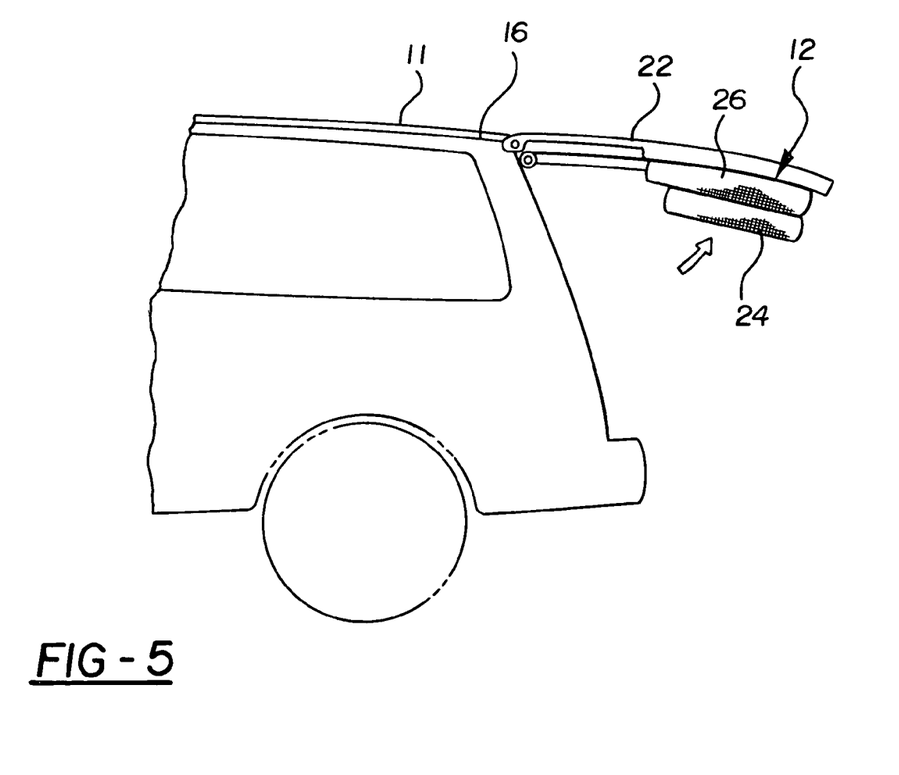
FIG. 5 is a side view of a vehicle showing the rear lift gate in an opened position with the seat cushion and the seat back secured to the rear lift gate.

Referring to FIG. 4, the seat assembly 12 is shown in the use configuration A and in the stowed configuration B. Referring to FIG. 5, the rear lift gate 22 may be opened with the rear seat assembly 12 secured thereto for access to the passenger compartment 10.

Figure 6:
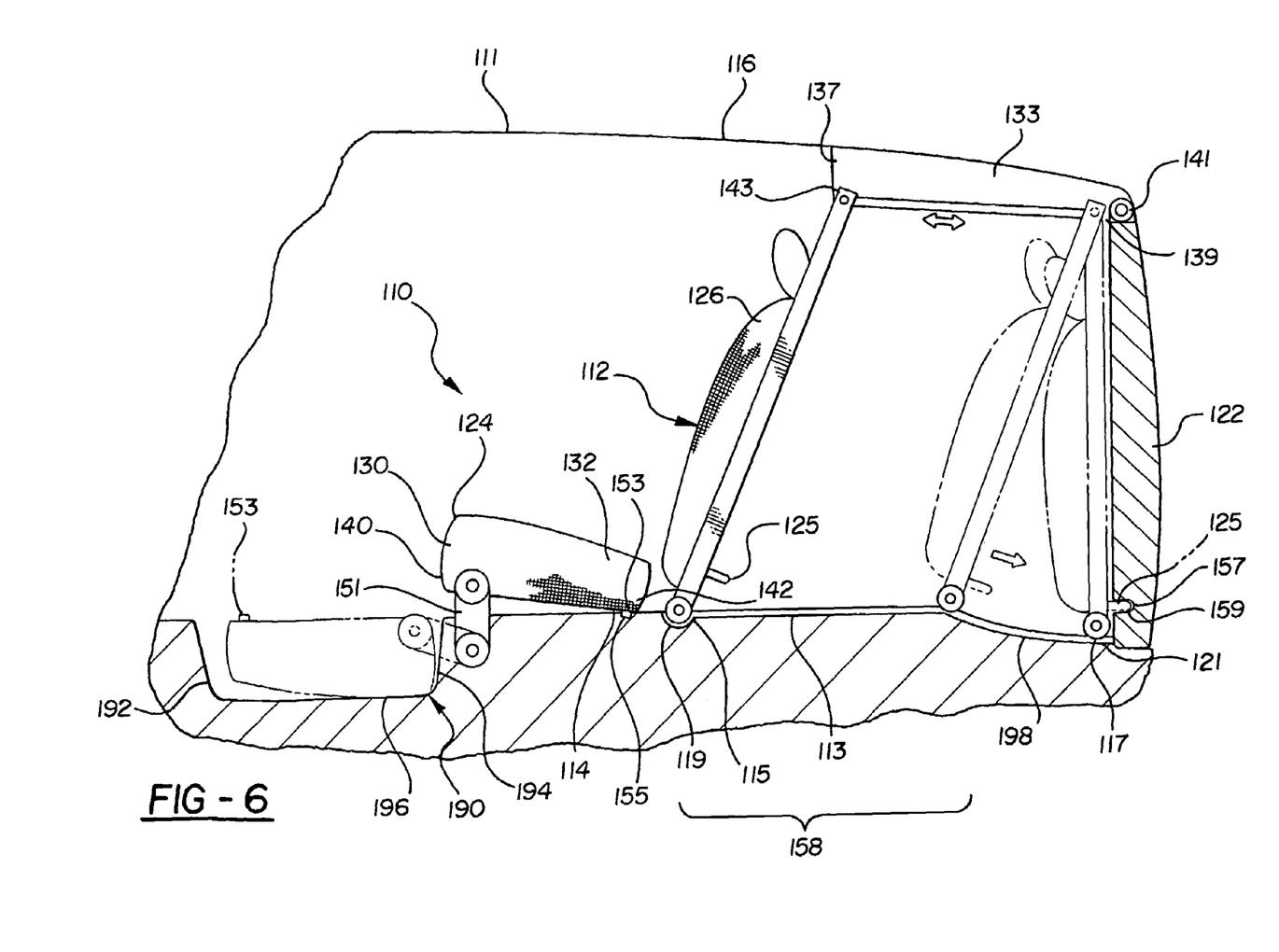
FIG. 6 is a side view of a second embodiment of the invention incorporated into a rear seat assembly.
Figure 7:
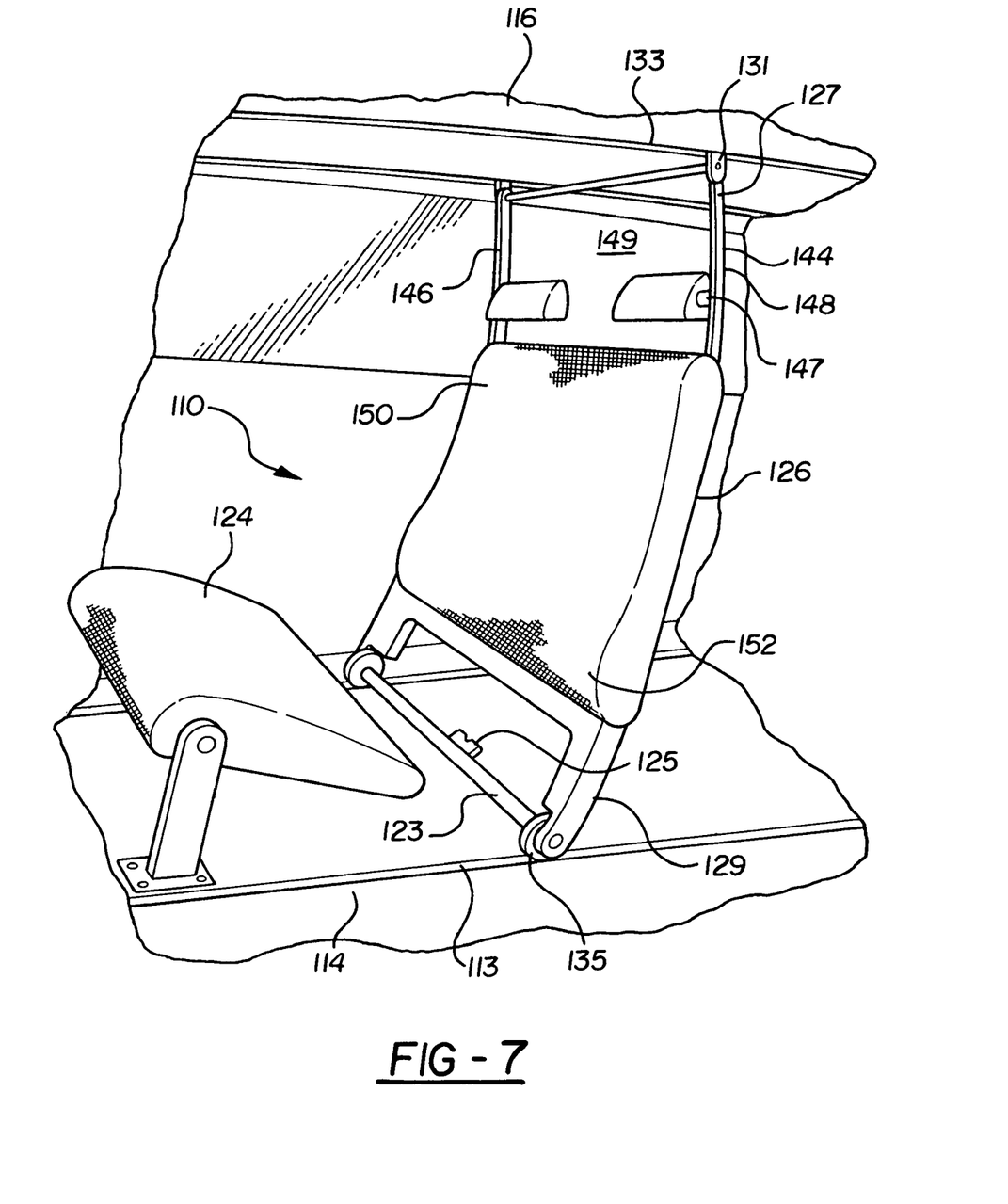
FIG. 7 is a perspective side view of the second embodiment a seat back.
Figure 8:
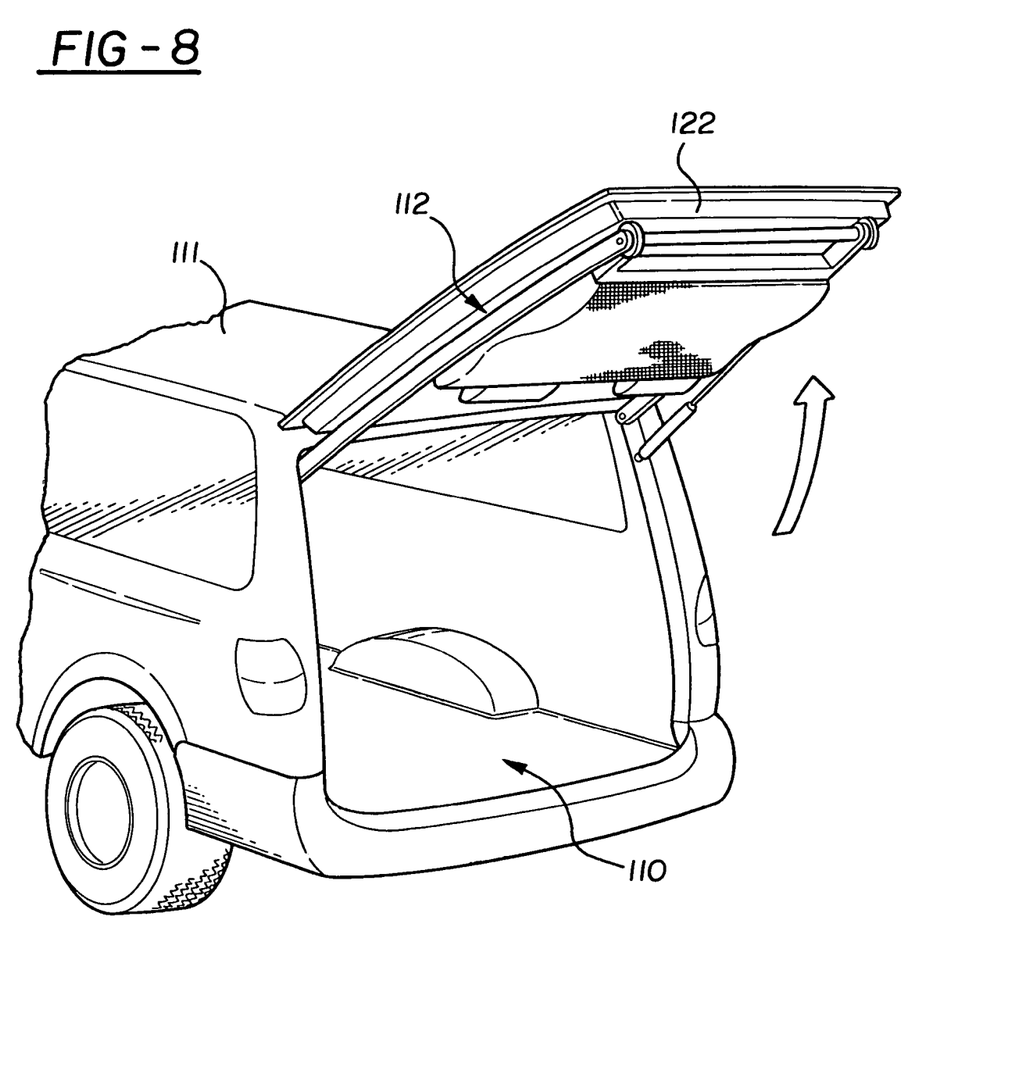
FIG. 8 is a perspective view of a motor vehicle showing a rear lift gate in an opened position and the seat back in a stowed configuration according to the second embodiment of the invention.

Referring to FIGS. 6–8, wherein similar elements are offset by 100 from those in the first embodiment, a second embodiment of the invention is shown. A passenger compartment, generally shown at 110, includes a rear seat assembly, which is generally indicated at 112. The passenger compartment 110 also includes a planar floor 114 and a roof 116. The floor 114 defines a recessed area, generally indicated at 190. The recessed area 190 includes a vertical front wall 192, a vertical rear wall 194, and a pair of vertical opposing lateral side walls (not shown) extending between the front wall 192 and the rear wall 194. A lower floor portion 196 interconnects the front wall 192, the rear wall 194, and the side walls. The floor 114 further defines an arcuate rear recessed area 198.

The translator 158 includes a pair of generally parallel guides 113 extending along the floor 114 between a first guide end 115 and a second guide end 117. The first guide end 115 includes a relief 119, and the second guide end 117 includes an arcuate section 121, which follows the contour of the floor 114.

The rear seat assembly 112 includes a seat back 126 and an independent seat cushion 124. Referring to FIG. 7, the seat back 126 includes a generally rectangular seat back frame 144 having two generally parallel side members 146, 148 interconnected by an upper cross member 150 and a lower cross member 152 for supporting a support bar 123. The support bar 123 includes a latch 125 fixedly secured thereto.

The seat back side members 146, 148 are mirror images of one another and, therefore, only side member 148 will be described. The side member 148 extends from a first end 127 generally at the roof 116 of the vehicle to a second end 129 generally located at the floor 114. The first end 127 of the side member 148 includes a roller mechanism 131 that slidably engages a track 133 positioned along the roof 116. The second end 129 of the side member 148 includes a roller mechanism 135 that follows the guide 113 for ease of moving the seat back 126 between a use configuration and a stowed configuration. Referring back to FIG. 6, the track 133 extends between a front end 137 and a rear end 139 ending generally at a hinge mechanism 141. The front end 137 has a latch 143 for locking the roller mechanism 131 when the rear seat assembly 112 is in the use configuration. A relief 145 prevents the seat back 126 from moving when locked in the use configuration.

Referring to FIG. 7, the side member 148 further includes a head restraint 147 slidably connected thereto. A transparent surface 149, made from Plexiglas, polycarbonate, or a similar material, interconnects the side members 146, 148 above the upper cross member 150. The transparent surface 149 supports the head restraint 147 to protect an occupant's head during a rear impact. In addition, the transparent surface 149 allows for rearward visibility.

Referring once again to FIG. 6, the seat cushion 124 includes a generally rectangular seat cushion frame 134 having a pair of generally parallel seat cushion side members 136, 138 interconnected by a front cross member 140 and a rear cross member 142. The seat cushion 124 includes a pair of generally parallel pivot arms 151. The pivot arms 151 are pivotally connected to the seat cushion side members 136, 138 and to the rear wall 194 to allow the seat cushion 124 to pivot between a use configuration, shown by A, and a stowed configuration, shown by B. The rear cross member 142 also includes a latch 153. A striker 155 extends out from the floor 114, and when the seat cushion 124 is moved into the seated position, the rear cross member latch 153 engages the striker 155 and creates a rigid seating area.

The rear lift gate 122 defines a recessed area 157. The recessed area 157 includes a striker 159. The recessed area 149 receives the latch 125 on the support bar 123 and guides the latch 125 into engagement with the striker 159.

In operation, the rear seat assembly 112 is generally found in the use configuration, as is shown at A in FIG. 6. The seat cushion 124 is released from the latch 153, which allows the seat cushion 124 to pivot about the pivot arms 151 to the rear wall 194 of the recessed area 190 thereby filling the recessed area 190 and creating a generally flat floor 114 at B in FIG. 6. The latch 143 is then actuated releasing the seat back side members 146, 148 and allowing for movement of the seat back 126 along the tracks 133 to the stowed configuration. The first end 127 of the seat back side members 146, 148 moves until the roller mechanisms 135 of the second end 129 of the seat back side members 146, 148 exit the relief. The second end 129 of the seat back side members 146, 148 then follows the guides 113 until the seat back 126 reaches the stowed configuration. At this time, the latch 125 enters the recessed area 157 of the rear lift gate 122 and engages the striker 159 therein, thus securing the seat assembly 112 to the rear lift gate 122. Referring to FIG. 8, the rear lift gate 122 may now be opened with the seat back 126 secured thereto for access to an uninterrupted passenger compartment 110. In this embodiment, the roller mechanisms 135 may be retained in the tracks 133 or, alternatively, they may be released when the lift gate 122 is opened. If they are retained, the tracks 133 must provide freedoms sufficient for the rollers 135 to move through two dimensions.

Figure 9:
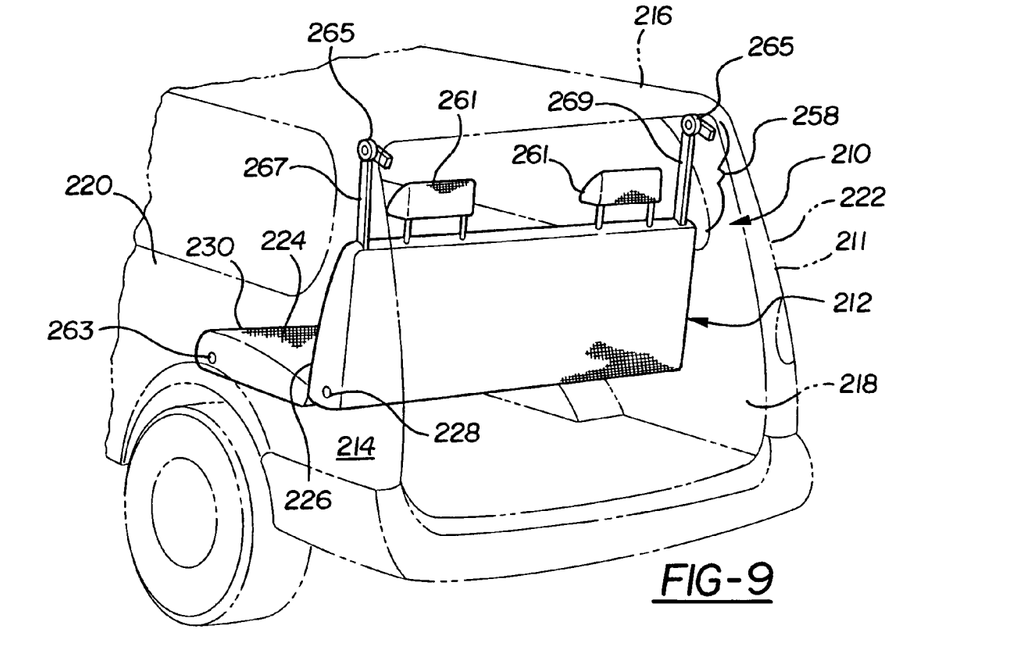
FIG. 9 is a perspective view of still a third embodiment of the invention incorporated into the rear seat assembly including a translator having a pivot mechanism and a pair of swing arms.
Figure 10:
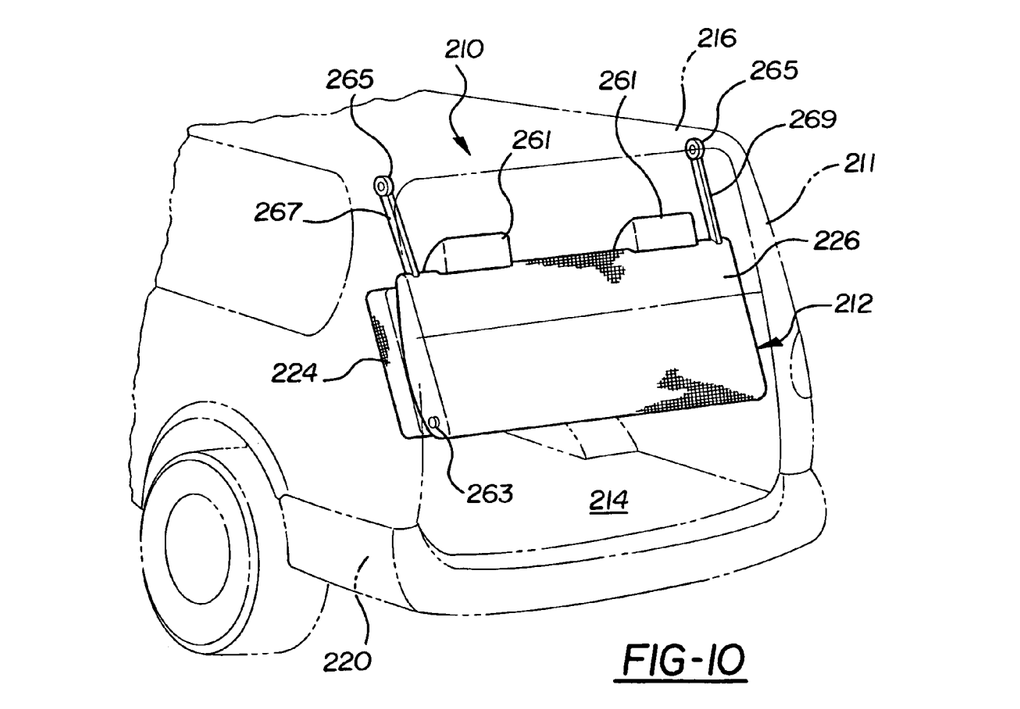
FIG. 10 is a perspective view of the rear seat assembly shown in FIG. 9 with the rear seat assembly in a stowed configuration.

Still another embodiment of the invention is shown in FIGS. 9 and 10 wherein reference characters for elements similar to those in the first embodiment are offset by 200. Referring to FIG. 9, a passenger compartment of a vehicle is generally shown at 210. The passenger compartment 210 includes a rear seat assembly, generally indicated at 212. The passenger compartment 210 further includes a floor 214 and a roof 216. A pair of opposing, generally parallel sidewalls 218, 220 extend laterally between a front portion of the vehicle and a rear lift gate 222. The sidewalls 218, 220 also extend vertically between the floor 214 and the roof 216.

The rear seat assembly 212 includes a seat cushion 224 pivotally coupled to a generally upright seat back 226 by a recliner mechanism 228. The rear seat assembly 212 also includes a pair of headrests 261 operatively coupled to the seat back 226 for folding pivotal movement from an upright use position to a forward tucked position against the seat back 226. The seat cushion 224 is releasably latched in the seating position to the opposing sidewalls 218, 220 by a latch 263.

A translator is generally shown at 258. The translator 258 serves to move the rear seat assembly 212 between a use configuration, as shown in FIG. 9, and a stowed configuration, as shown in FIG. 10. The translator 258 includes a concentric pivot mechanism 265 extending downwardly from the roof 216. The translator 258 also includes a pair of swing arms 267, 269 extending upwardly from the seat back 226 to the roof 216. The swing arms 267, 269 are pivotally coupled to the roof 216 by the concentric pivot mechanism 265. The swing arms 267, 269 support the rear seat assembly 212 from the roof 216 and also hold the rear seat assembly 212 above the floor 214. The pivot mechanism 265 is concentric with a pivot axis of the rear lift gate 222 to allow pivotal movement of the rear lift gate 222 between an open position and a closed position.

In operation, starting from the use configuration as shown in FIG. 9, the seat cushion 224 is released from the sidewalls 218, 220 by actuation of the latch 263. The recliner mechanism 228 is then activated allowing the seat cushion 224 to pivot upwardly against the seat back 226. The headrests 261 may also be pivoted to a tucked position against the seat back 226. The translator 258 then pulls the seat back 226 and the seat cushion 224 rearwardly against the rear lift gate 222. After the seat back 226 has moved to a stowed configuration adjacent to the rear lift gate 222, the seat back 226 may further be latched or otherwise secured to the rear lift gate 222. The swing arms 267, 269 pivotally support the rear seat assembly 212 upon pivotal movement between the use configuration and the stowed configuration adjacent to the rear lift gate 222.

Since the pivot mechanisms 265 are concentric with the pivots of the rear lift gate 222, the rear seat assembly 212 may pivot therewith in the stowed configuration when the lift gate 222 is pivoted between the closed and open positions. As a result, unobstructed access to the passenger compartment 210 is provided.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A rear seat assembly movable between a use configuration and a stowed configuration within a passenger compartment of a motor vehicle having a floor, a roof, a pair of sidewalls extending between the floor and the roof, and a rear lift gate, said rear seat assembly comprising:

a seat cushion having a front portion and a rear portion;

a seat back disposed adjacent to said rear portion of said seat cushion; and a translator coupled to said seat back, said translator moving said seat back between the use configuration and the stowed configuration wherein said seat back is secured to the rear lift gate and moves therewith between its open and closed positions, wherein said translator includes a recess extending through each of the sidewalls and extending from a position disposed adjacent the rear lift gate to a position fore thereof.

2. The rear seat assembly as set forth in claim 1 wherein said translator includes a set of front rollers coupled to said front portion of said seat cushion, said front rollers being positioned within said recesses to secure said front portion of said seat cushion in an orientation with respect to the sidewalls.

3. The rear seat assembly as set forth in claim 2 wherein said translator includes a set of rear rollers coupled to said rear portion of said seat cushion, said rear rollers being positioned within said recesses to secure said rear portion of said seat cushion in an orientation with respect to the sidewalls.

4. The rear seat assembly as set forth in claim 3 wherein said translator includes a latch coupled to each of said recesses, said latch engaging said front rollers to hold said rear seat assembly in the use configuration.

5. The rear seat assembly as set forth in claim 4 wherein said translator includes a button positioned on one of the sidewalls, said front rollers releasing from said latch to allow said rear seat assembly to move from the use configuration toward the stowed configuration when said button is activated.

6. The rear seat assembly as set forth in claim 5 wherein said seat back includes a seat back latch extending out towards the rear lift gate to selectively engage the rear lift gate when said seat back abuts thereagainst.

* * * * *